United States Patent
Kotera et al.

(10) Patent No.: US 6,595,623 B2
(45) Date of Patent: Jul. 22, 2003

(54) PLASTIC BASE MATERIAL AND METHOD FOR THE MANUFACTURE THEREOF; AND HEAD FOR INK-JET PRINTER AND METHOD FOR THE MANUFACTURE THEREOF

(75) Inventors: Koichi Kotera, Osaka (JP); Hiroyoshi Tanaka, Kyoto (JP); Isamu Inoue, Neyagawa (JP); Osamu Watanabe, Tamana (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/953,965

(22) Filed: Sep. 18, 2001

(65) Prior Publication Data

US 2002/0022139 A1 Feb. 21, 2002

Related U.S. Application Data

(62) Division of application No. 09/269,794, filed as application No. PCT/JP97/03452 on Sep. 29, 1997, now Pat. No. 6,296,946.

(30) Foreign Application Priority Data

Oct. 1, 1996 (JP) .............................................. 8-260397

(51) Int. Cl.$^7$ .............................. B41J 2/135; C08J 7/18; C23C 14/02; H05H 1/24

(52) U.S. Cl. ........................ 347/45; 427/577; 427/490; 427/534

(58) Field of Search .............................. 347/44, 45, 47, 347/56, 68–72; 428/473.5; 427/490, 534, 536, 569, 577, 8–10

(56) References Cited

U.S. PATENT DOCUMENTS

| 5,795,655 A | | 8/1998 | Endo ........................... 428/458 |
| 5,911,834 A | * | 6/1999 | Fairbairn et al. ............. 134/1.3 |
| 6,126,269 A | * | 10/2000 | Takemoto et al. ............. 347/45 |
| 6,243,112 B1 | * | 6/2001 | Kuhman et al. ............... 347/45 |

FOREIGN PATENT DOCUMENTS

| JP | 5599932 A | 7/1980 |
| JP | 58175666 A | 10/1983 |
| JP | 6335632 A | 2/1988 |
| JP | 63114978 A | 5/1988 |
| JP | 0320465 B | 3/1991 |
| JP | 0568874 A | 3/1993 |
| JP | 050116325 | 5/1993 |
| JP | 6313615 B | 2/1994 |

* cited by examiner

*Primary Examiner*—John Barlow
*Assistant Examiner*—An H. Do
(74) *Attorney, Agent, or Firm*—Smith, Gambrell & Russell, LLP

(57) ABSTRACT

There is provided a plastic base material having a reformed layer 2 formed on a plastic substrate 1 by reforming the surface layer thereof into a component containing fluorine at the ratio of the number of fluorine atoms to the number of carbon atoms, F/C, of 0.85 or more and 1.30 or less, and having highly durable water repellency and ink repellency. The method of manufacturing such a plastic base material comprises a step of reforming the surface of the plastic substrate 1 into a fluorine-containing carbon layer by imparting a specific energy to fluorine-containing plasma by applying an RF bias voltage to the plastic substrate 1 to form a surface having highly durable water repellency and ink repellency. A highly durable ink-jet printer that enables high-quality printing can be provided by the use of a head for an ink-jet printer fabricated by using this plastic base material.

8 Claims, 15 Drawing Sheets

PLASTIC BASE MATERIAL AND METHOD FOR THE MANUFACTURE THEREOF; AND HEAD FOR INK-JET PRINTER AND METHOD FOR THE MANUFACTURE THEREOF

This is a Division of application Ser. No. 09/269,794, filed Apr. 1, 1999, now U.S. Pat. No. 6,296,946, which is the U.S. national stage of PCT/JP97/03452, filed Sep. 29, 1997.

TECHNICAL FIELD

The present invention relates to a plastic base material having excellent water repellency and ink repellency, and the durability of such water repellency and ink repellency; a method for manufacturing such a plastic base material; a head for ink-jet printers; and a method for manufacturing such a head.

BACKGROUND ART

In recent year, a demand for printers has been increased accompanying the diffusion of personal computers into homes. In particular, ink-jet printers have significantly been diffused because of their small noise during operation, the capability of high-speed printing, and the ease of application for color printing.

Heretofore, various systems of ink-jet printers have been proposed.

FIG. 13 is a sectional view showing the construction of a conventional head for a pressure control type ink-jet printer. As FIG. 13 shows, such a head has the construction in which ink 56 stored in an ink chamber is ejected for printing through a nozzle opening 53 of a nozzle-forming film 51 dropwise using an ultrasonic oscillator 58 according to pulse signals.

Next, FIG. 14 is a sectional view showing the construction of a conventional head for a heater heating type ink-jet printer. As FIG. 14 shows, such a head has the construction in which ink 56 is heated according to pulse signals by a heater 55 to which electrodes 54 are connected to produce air bubbles 57 and eject the ink 56 through a nozzle opening 53 of a nozzle-forming film 51.

In both systems, a film having a thickness between 0.1 and 0.5 mm consisting of polyimide which excels in heat resistance is used as the nozzle-forming film 51. Since the nozzle opening 53 of the nozzle-forming film 51 is often formed by a laser heating process, and heat resistance is required for the film, polyimide is usually used as the material for the nozzle-forming film 51.

Next, FIG. 15 is a sectional view showing ink ejection in a conventional ink-jet printer. When ink 56 is ejected through a nozzle opening 53, it is essential for high-quality printing that the ink 56 is ejected straight as FIG. 15(a) shows.

However, conventional ink-jet printers have a drawback in that if the ink 56 conforms to the nozzle-forming film 51 and wets the film 51, the ink 56 is attracted toward the wet surface resulting in that the ink 56 cannot be ejected straight as FIG. 15(b) shows, and the track of ink ejection becomes unstable. There was a problem that, in particular, if the ink is ejected for a long period of time, the nozzle forming film 51 tended to be wet by the ink and thus the quality of printing was degraded.

DISCLOSURE OF THE INVENTION

The present invention has been performed to solve problems in conventional systems as described above. It is a main object of the present invention to solve the unstableness of ink ejecting track caused by the conformity of ink to the nozzle-forming film formed by a plastic material represented for example by polyimide for a long period of time.

The present invention of claim 1 is a plastic base material having a layer containing fluorine and carbon on the surface thereof, the ratio of the number of said fluorine atoms to the number of said carbon atoms, F/C, being 0.85 or more and 1.30 or less.

The present invention of claim 6 is a method of manufacturing a plastic base material comprising a step of reforming the upper layer of a plastic base material into a layer containing fluorine and carbon by irradiating fluorine-containing plasma onto said plastic base material.

The present invention of claim 9 is a head for an ink-jet printer comprising a nozzle constituting member having a plurality of nozzle openings formed thereon, for ejecting ink from said nozzle openings, wherein a fluorine-containing layer is formed on the surface of said nozzle constituting member.

The present invention of claim 14 is a method of manufacturing a head for an ink-jet printer comprising a nozzle-forming member having a plurality of nozzle openings formed thereon, for ejecting ink from said nozzle openings, comprising a step of reforming the upper layer of said nozzle-forming film into a layer containing fluorine by irradiating fluorine-containing plasma onto the surface of said nozzle constituting member.

DESCRIPTION OF SYMBOLS

Figure 1:
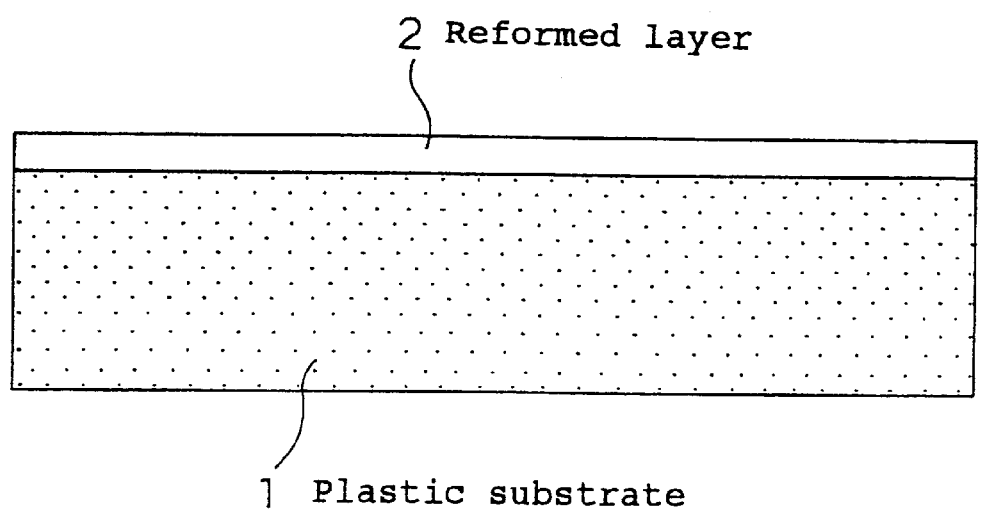
FIG. 1 is a sectional view showing the construction of a plastic base material according to an embodiment of the present invention.

1. Plastic substrate
2. Reformed layer
21. Exhaust system
22. Processing chamber
23. Plasma generation chamber
24. Gas introduction system
25. Microwave power generator
26. Solenoid coil
27. Plasma
28. RF power source
29. Electrodes for substrate
51. Nozzle-forming film
52. Reformed layer
53. Nozzle opening
54. Electrodes
55. Heater
56. Ink
57. Air bubble
58. Ultrasonic oscillator
70. Processing chamber
71. Exhaust system
72. Electrode for substrate
73. RF power source
74. Counter electrode

BEST MODE FOR CARRYING OUT THE INVENTION

Embodiments of the present invention will be described below referring to drawings.

Embodiment 1

FIG. 1 is a sectional view showing the construction of a plastic base material according to an embodiment of the present invention. The polyimide constituting the plastic substrate 1 has a composition containing oxygen as the following chemical formula 1 shows.

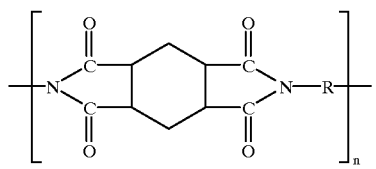

(Chemical formula 1)

Plastics composed of carbon, hydrogen, and nitrogen, containing oxygen as shown above has higher affinity for water or ink than plastics containing no oxygen (e.g. polystyrene). In the case of polyimide, the angle of contact of a water drop when water is dropped is as low as about 65°, exhibiting hydrophilicity. When water-based ink is dropped, or oil-based ink is dropped, the angle of contact is almost the same as that of a water drop, indicating affinity for ink.

In the present invention, the plastic base material is constituted by forming a reformed layer 2 containing fluorine, and having a ratio of the number of fluorine atoms to the number of carbon atoms, F/C, of 0.85 or more and 1.30 or less, on the surface of the plastic substrate 1.

A method of manufacturing for forming water repellent and ink repellent surface of this embodiment will be described below referring to FIGS. 2 through 10.

Figure 2:
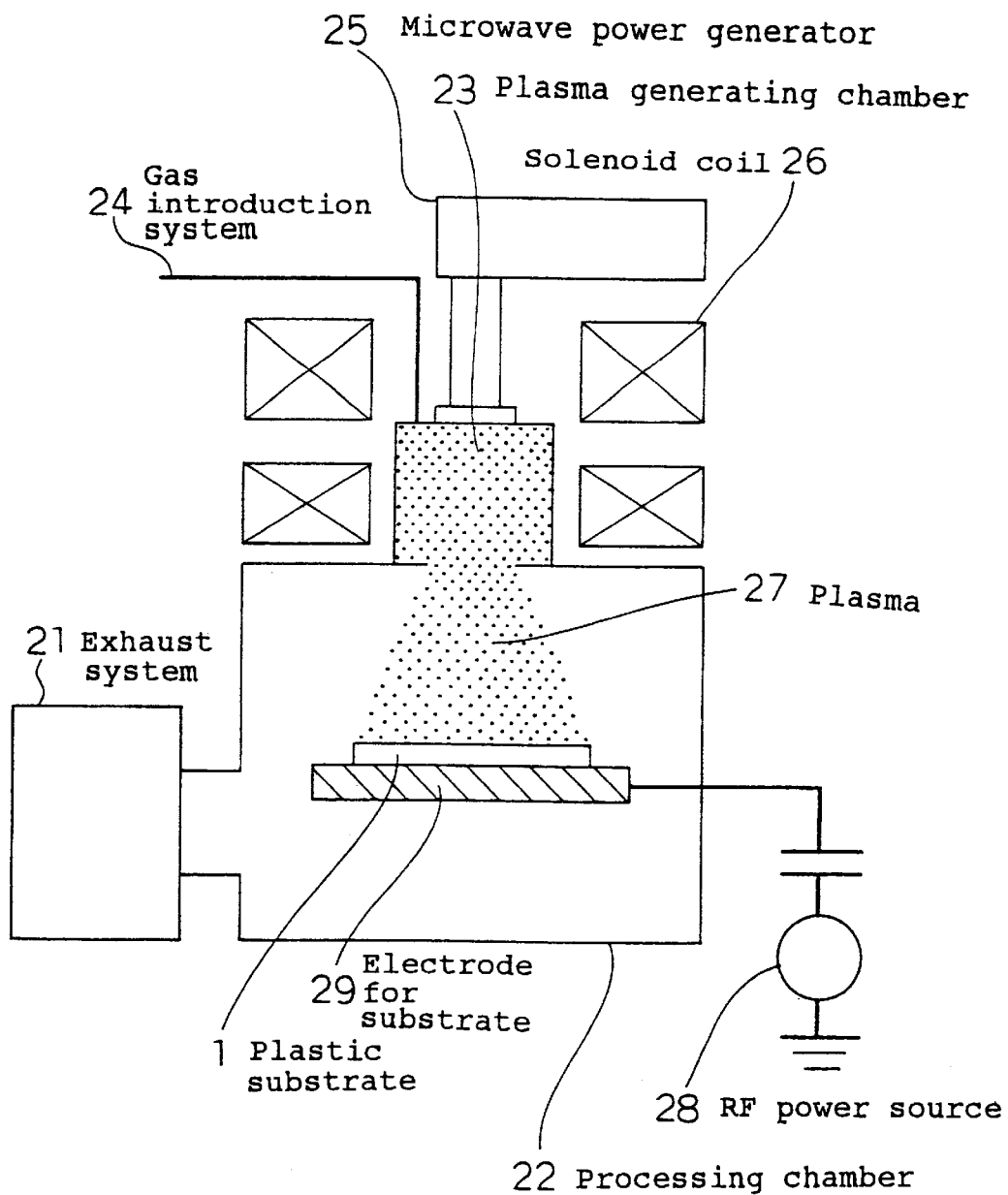
FIG. 2 is a schematic diagram of processing equipment used for the manufacture of a plastic base material according to an embodiment of the present invention.

FIG. 2 is a schematic diagram of processing equipment. A processing chamber 22 to which an exhaust system 21 is connected is provided with a plasma generation chamber 23. To the plasma generation chamber 23 is supplied a gas from a gas introduction system 24, as well as microwaves of 2.45 GHz from a microwave power generator 25. Plasma 27 is generated in the plasma generation chamber 23 by electron cyclotron resonance (ECR) produced by the interaction of a magnetic field from a solenoid coil 26 installed around the plasma generation chamber 23 with the microwaves. In the processing chamber 22, a plastic substrate 1 is placed on an electrode for the substrate 29, and irradiated by plasma 27 from the plasma generation chamber 23. An RF bias voltage is supplied to the electrode for the substrate 29 from an RF power source 28.

A polyimide-based material is used in the plastic substrate 1, and $CF_4$ gas is introduced from a gas introduction system 24. By the introduction of the $CF_4$ gas, the pressure at this time is $4\times10^{-4}$ Torr. Microwave power of 200 W is supplied from the microwave power generator 25 to generate ECR plasma of $CF_4$, and irradiated onto the plastic substrate 1.

Figure 3:
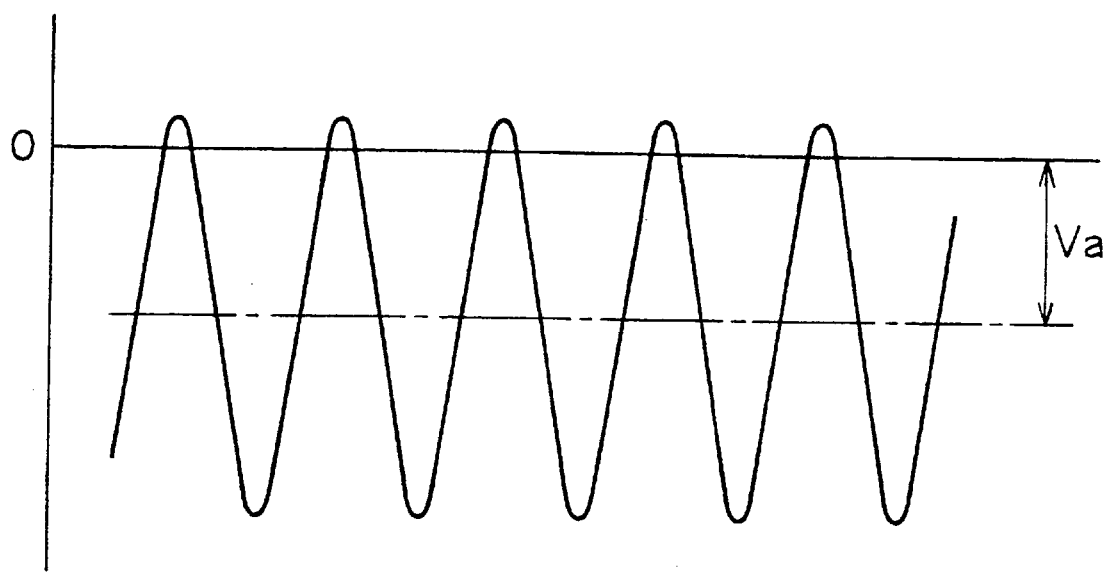
FIG. 3 is a graph showing potential applied on the plastic base material during the manufacture of a plastic base material according to an embodiment of the present invention.

An RF bias voltage is supplied to the plastic substrate 1 from an RF power source 28. FIG. 3 shows the potential of the plastic substrate 1, and a negative auto-bias voltage is generated on the plastic substrate 1 by applying the RF voltage. The voltage Va between the average potential and the ground potential at this time is referred to as the RF bias voltage. Here, radiation treatment was performed with an RF bias voltage of −20 V, and the upper layer of the plastic substrate 1 was reformed to a fluorine-containing reformed layer 2, to form the plastic base material.

Figure 4:
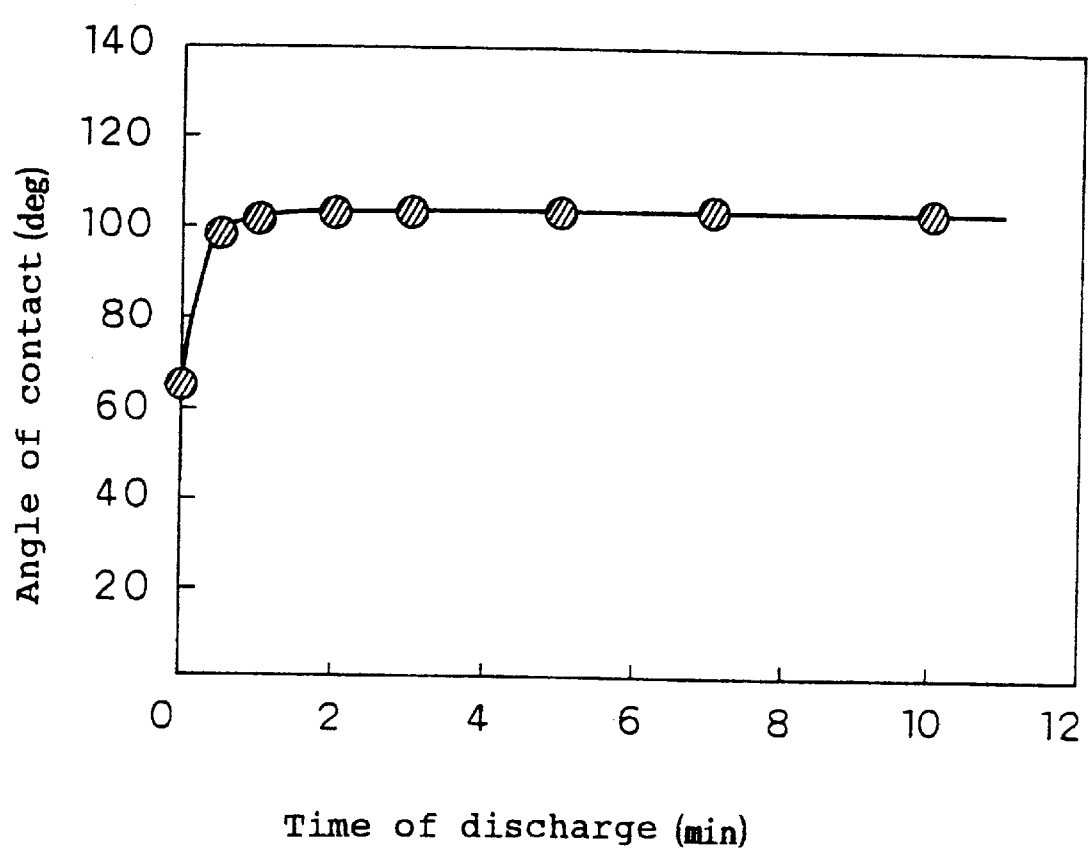
FIG. 4 is a graph showing relationship between water repellency of a reformed layer formed on the surface of a plastic base material according to an embodiment of the present invention and discharging time.
Figure 5:
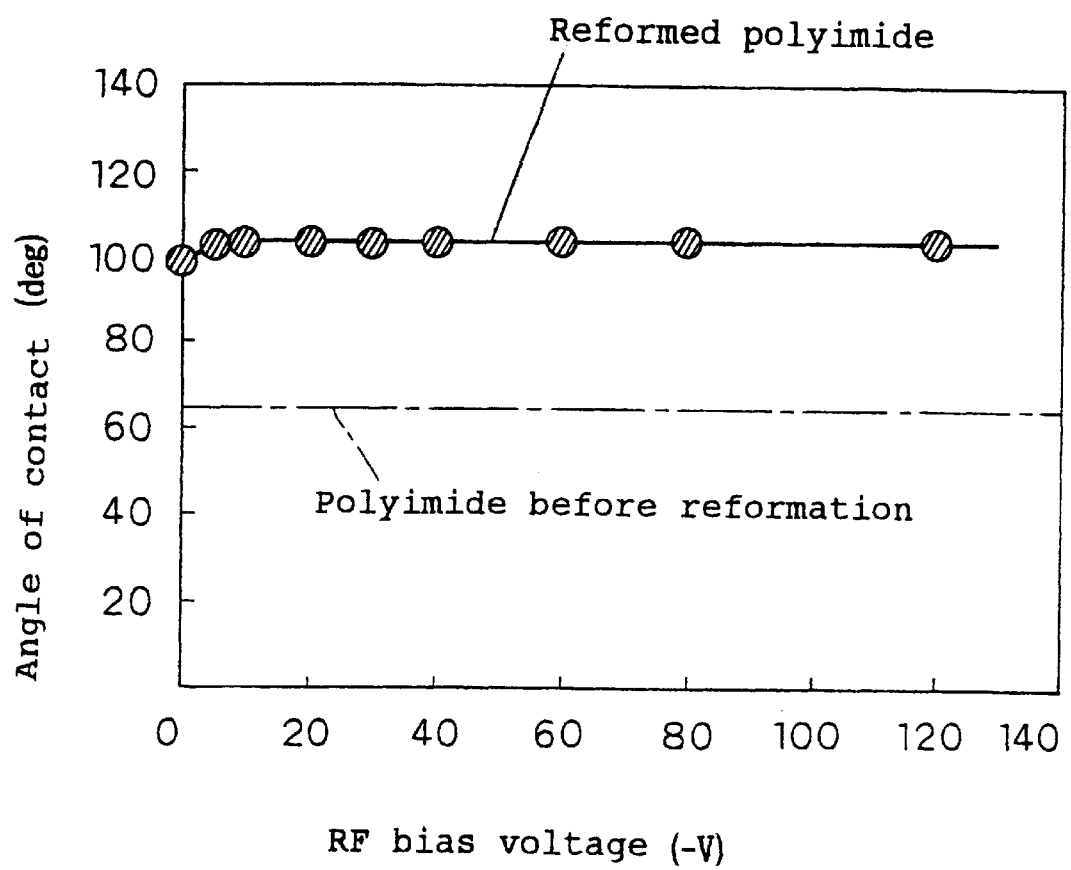
FIG. 5 is a graph showing relationship between water repellency of a reformed layer formed on the surface of a plastic base material according to an embodiment of the present invention and RF bias voltage.

FIG. 4 is the result of evaluating the water repellency of the surface reformed by the plasma treatment as described above in terms of the angle of contact of water. Although the surface of polyimide before reformation has the angle of contact as small as about 65° as mentioned above, the angle of contact increases rapidly by the plasma treatment as described above, and saturates at about 103°, indicating reformation to the surface of a high water repellency. Here, although the RF bias voltage was −20 V, plasma was irradiated while applying various other RF bias voltages, and change in angles of contact were observed. The result is shown in FIG. 5. At every RF bias voltage, the angle of contact larger than 65° before reformation was obtained. More specifically, although the angle of contact is slightly decreased at an RF bias voltage of 0 V, almost the same angle of contact was obtained, and high water repellency was observed. The similar evaluation was performed for water-based and oil-based inks, and almost equivalent results to those for the angle of contact of water were obtained.

Figure 6:
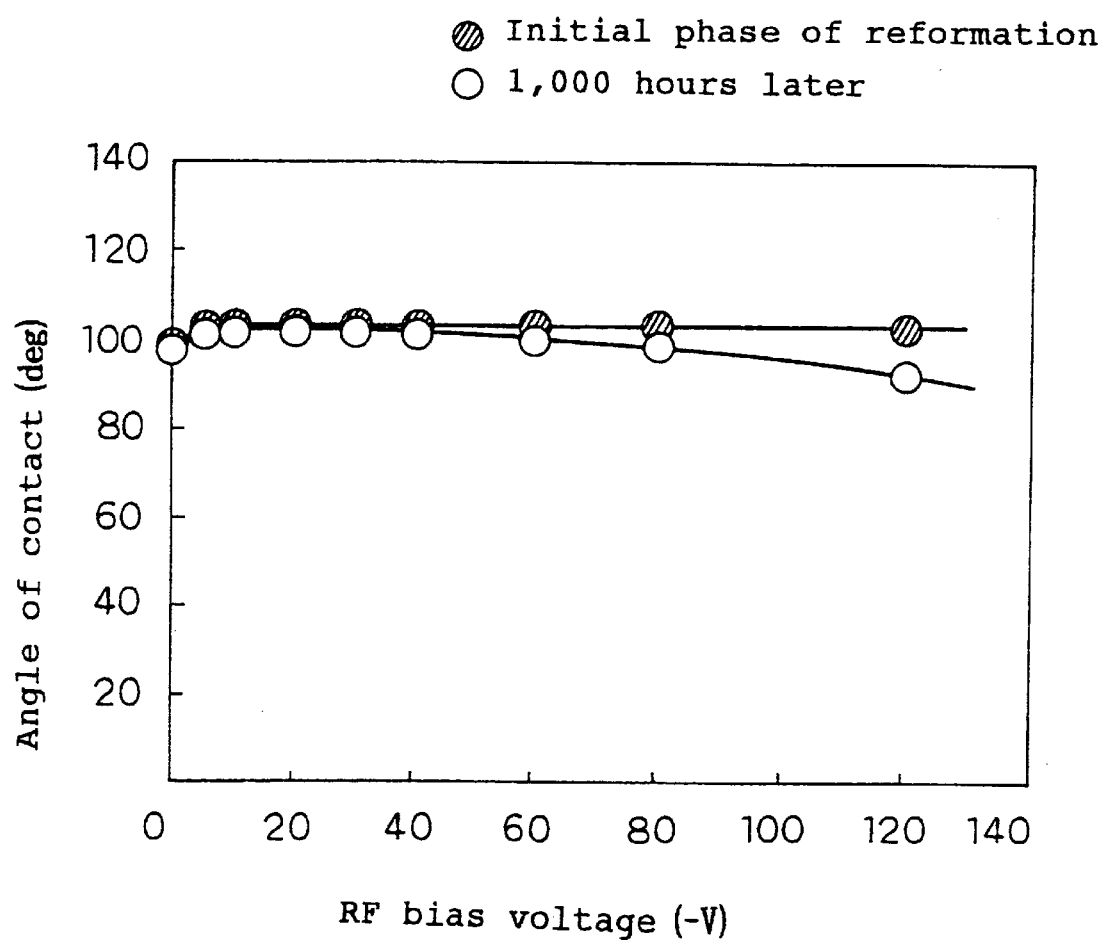
FIG. 6 is a graph showing relationship between change in water repellency with time of a reformed layer formed on the surface of a plastic base material according to an embodiment of the present invention and RF bias voltage.

Next, change with time in the angles of contact on the surface of polyimide subjected to plasma treatment as described above was examined. The result is shown in FIG. 6. As FIG. 6 shows, change in RF bias voltages with time had the following significant difference. This result of change with time was obtained by the test for 1000 hours performed under a normal ambient condition of a temperature of 25° C. and a relative humidity of 45%. In the negative RF bias voltage range between 0 V or more and 40 V or less, little decrease in angle of contact is observed, and the surface has durable water repellency. However, when the negative RF bias voltage exceeds 40 V, the angle of contact decreases compared with the state soon after reformation, and change with time is observed.

Figure 7:
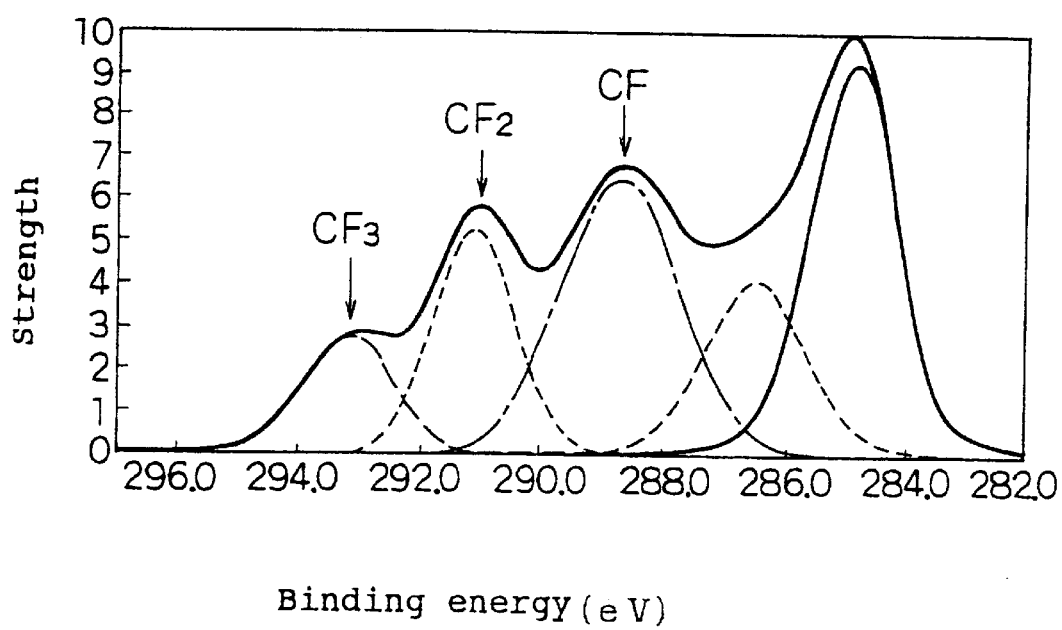
FIG. 7 is a graph showing the analytical results of XPS spectra of a reformed layer formed on the surface of a plastic base material according to an embodiment of the present invention.

The results of observation of the surface of the reformed layer 2 of polyimide with X-ray photoelectron spectrometry (XPS), and the analysis of the spectra are shown in FIG. 7. The peaks of CF, $CF_2$, and $CF_3$ are found in the $C_{1S}$ spectrum, and the formation of C—F bonds in the reformed layer is confirmed.

Figure 8:
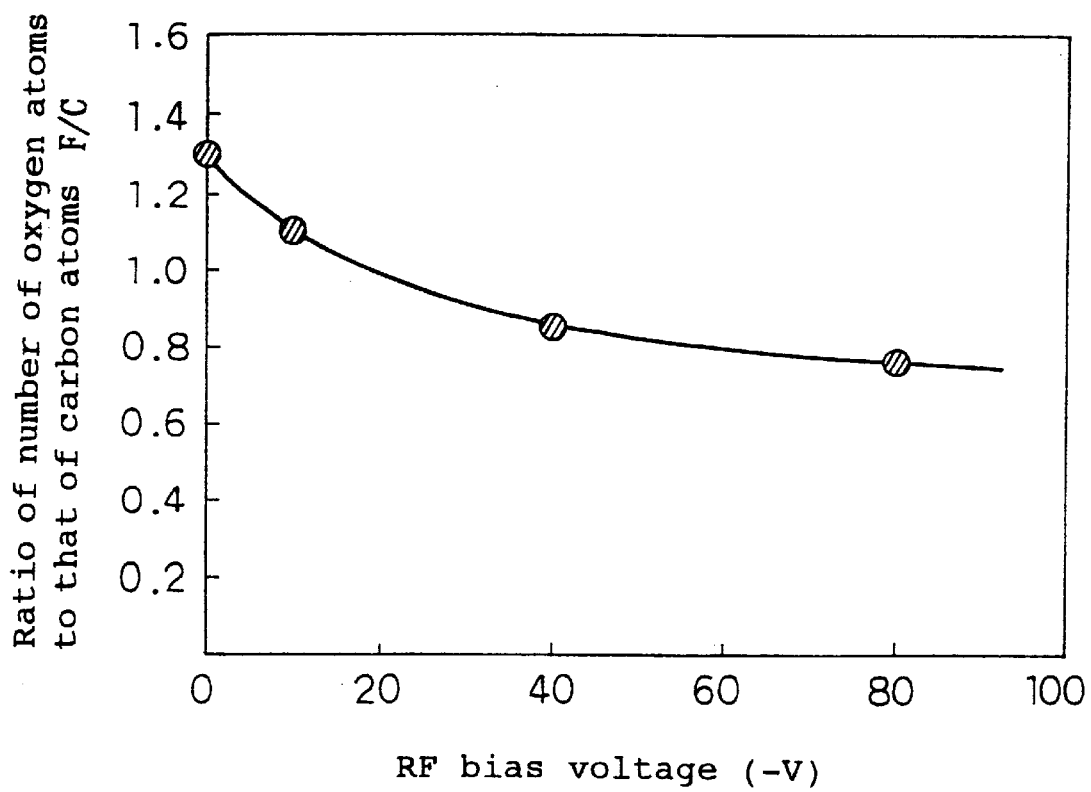
FIG. 8 is a graph showing relationship between the RF bias voltage of a reformed layer formed on the surface of a plastic base material according to an embodiment of the present invention and the ratio of the number of fluorine atoms to the number of carbon atoms (F/C)

FIG. 8 shows the analysis of the composition in the reformed polyimide surface treated by plasma with X-ray photoelectron spectrometry (XPS) indicated by RF bias voltage as a parameter, and shows the ratio of the number of oxygen atoms to the number of carbon atoms, F/C, as the composition on the ordinate. As RF bias voltage increases, F/C decreases. In the change in angles of contact with time shown in FIG. 5, a water-repellent surface without change with time is obtained by applying a negative RF bias voltage in the range between 0 V or more and 40 V or less. In the composition of FIG. 8, however, the F/C value is 1.30 when the RF bias voltage is 0 V, and the F/C value is 0.85 when the RF bias voltage is 40 V. That is, it is found here that a durable excellent water-repellent surface is provided in the F/C value range between 0.85 or more and 1.30 or less as the surface composition of the reformed surface.

Figure 9:
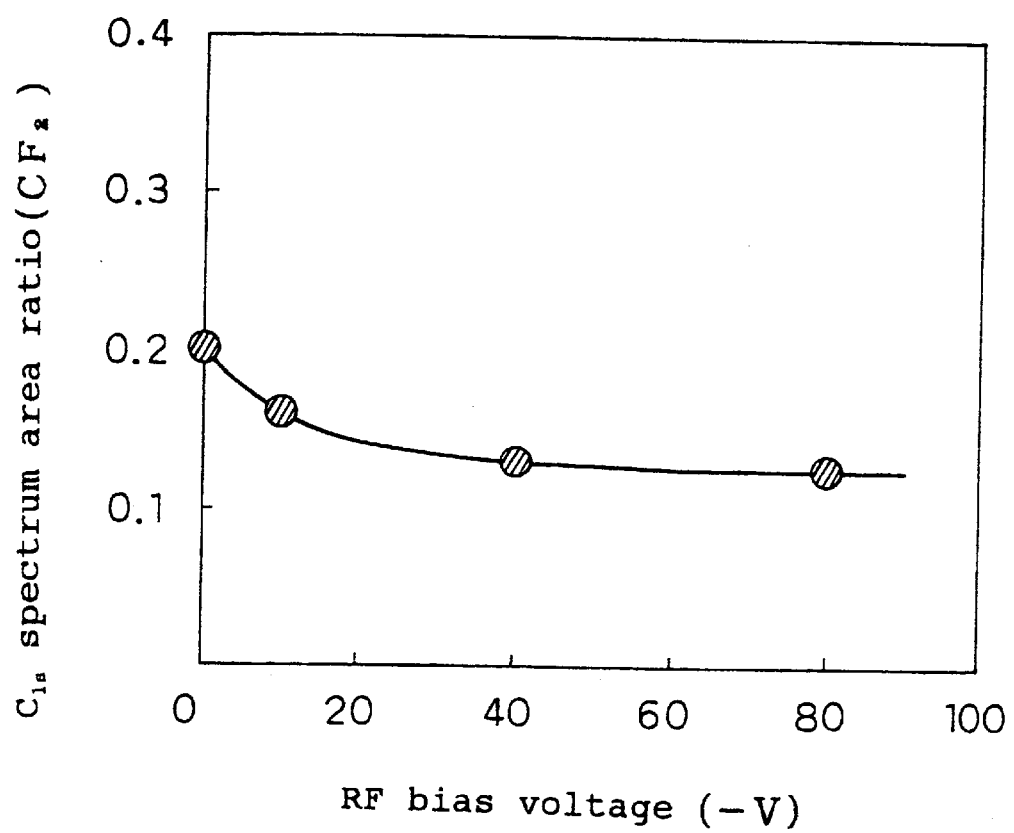
FIG. 9 is a graph showing the ratio of the area of $CF_2$ signals to the total area of $C_{1S}$ signals when a reformed layer formed on the surface of a plastic base material according to an embodiment of the present invention is observed by XPS.

FIG. 9 shows the result of obtaining the ratio of the area of $CF_2$ signals to the total area of $C_{1S}$ signals in the XPS spectra of the reformed polyimide surface indicated by RF bias voltage as a parameter. The ratio of the area of $CF_2$ signals decreases with increase in the RF bias voltage, and the ratio of 0.13 or more and 0.20 or less is obtained when the RF bias voltage is in the range between 0 V or more and −40 V or less where the change with time in the angles of contact is little.

Figure 10:
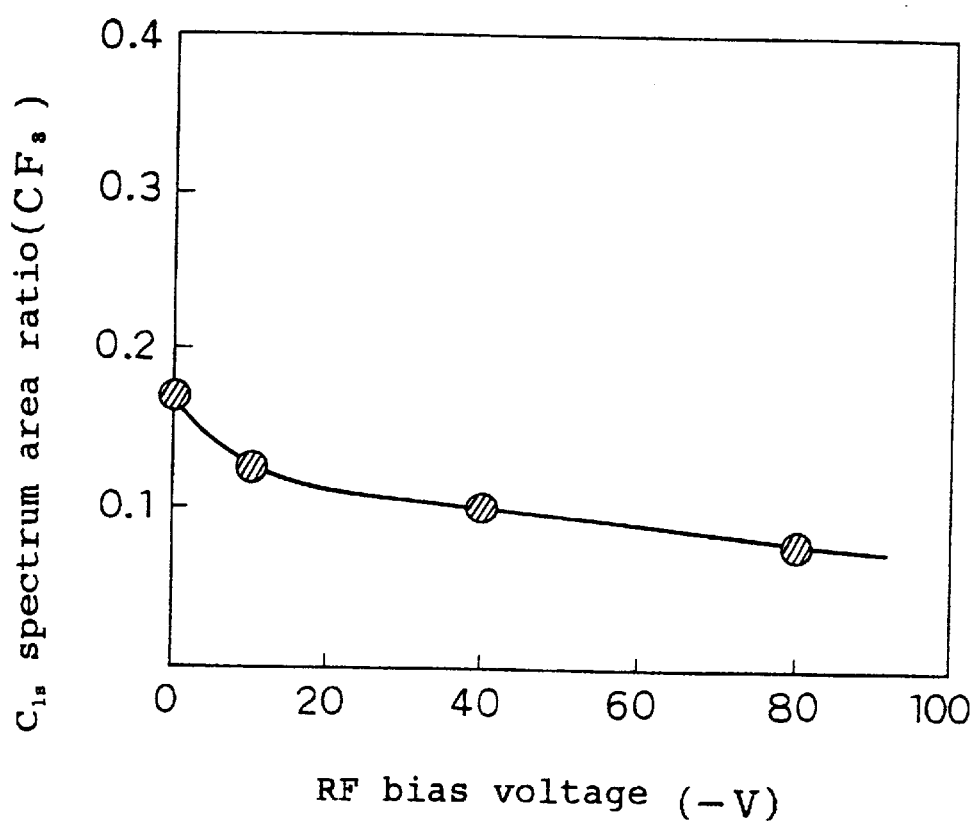
FIG. 10 is a graph showing the ratio of the area of $CF_3$ signals to the total area of $C_{1S}$ signals when a reformed layer formed on the surface of a plastic base material according to an embodiment of the present invention is observed by XPS.

FIG. 10 shows the result of obtaining the ratio of the area of $CF_3$ signals to the total area of $C_{1S}$ signals in the XPS spectra of the reformed surface. The ratio of the area of $CF_3$ signals decreases with increase in RF bias voltage, as the ratio of the area of $CF_2$ signals does, and it was found from this that the ratio of the area of $CF_3$ signals to the total area of $C_{1S}$ signals is preferably in the range between 0.10 or more and 0.17 or less corresponding to negative RF bias voltage of 0 V or more and 40 V or less.

As FIG. 6 shows, decrease in the angle of contact is observed by applying a negative RF bias voltage exceeding 40 V as compared with the initial phase of reformation. This is considered to be caused by decrease in the ratio of the area of $CF_2$ signals, or the area of $CF_3$ signals, to the total area of $C_{1S}$ signals. That is, although plasma having energy enhanced by the RF bias voltage accelerates C—F bonding to form $CF_2$ and $CF_3$ bonds, the bias voltage exceeding −40 V will adversely affect the plastic base material, resulting in inhibiting C—F bonding and deteriorating the properties with time. Therefore, it is found to be effective for providing durable water-repelling and ink-repelling surface that the ratio of the area of $CF_2$ signals to the total area of $C_{1S}$ signals on the reformed polymide surface be in the range between 0.13 or more and 0.20 or less, or the ratio of the area of $CF_3$ signals to the total area of $C_{1S}$ signals be in the range between 0.10 or more and 0.17 or less.

When the result of obtaining the aging properties of angles of contact as shown in FIG. 6 as the function of RF bias voltages is observed in detail, a slight decrease in the angle of contact is observed after 1000 hours at an RF bias voltage of −40 V. When the RF bias voltage is 0 V, although little change in the angle of contact with time is found, the angle of contact in the initial phase of reformation is slightly smaller than those at other bias voltages, and water repellency is slightly poorer. It is found by this that applying a negative RF bias voltage in the range between 5 V or more and 30 V or less onto the plastic base material is further desirable.

Embodiment 2

Figure 11:
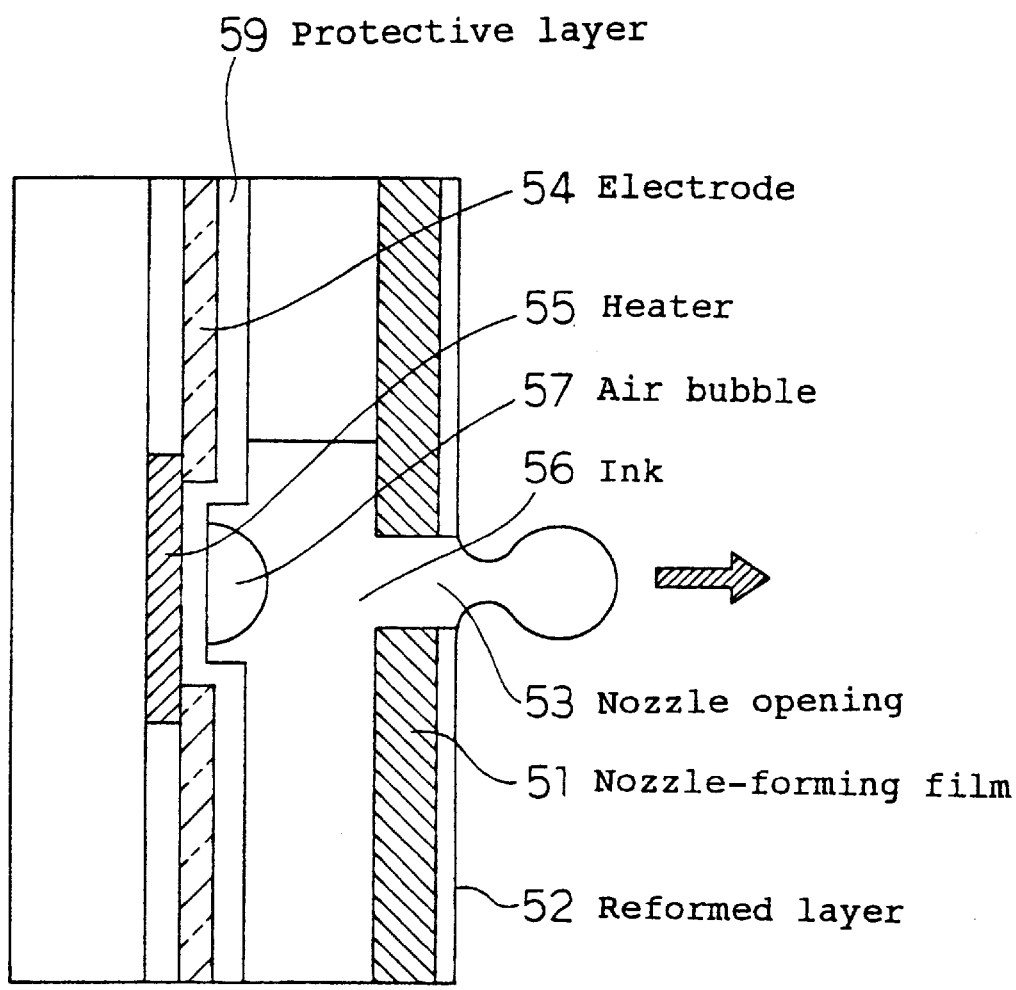
FIG. 11 is a sectional view showing the construction head for ink-jet printers according to an embodiment the present invention.

FIG. 11 is a sectional view showing the construction of a head for an ink jet printer according to an embodiment of the present invention. The embodiment of the present invention will be described using a heater type head as an example. Ink 56 is heated via the protective film 59 by the heater 55 to which electric power is supplied corresponding to pulse signals from electrodes 54, and an air bubble 57 is formed in the ink 56. The ink 56 is pushed by this air bubble 57 out of the nozzle opening 53 formed in the nozzle-forming film 51 mainly composed of polyimide, and ejected toward a sheet of paper to be printed.

In this embodiment, it is preferred, from the result of Embodiment 1 described above, that a fluorine-containing reformed layer is formed on the surface of the nozzle-forming film 51, and that the reformed layer has a composition having a ratio of the number of fluorine atoms to the number of carbon atoms F/C between 0.85 or more and 1.3 or less. Here, the nozzle-forming member of the present invention corresponds to the nozzle-forming film 51.

Next, a method of manufacturing for forming a head for an ink jet printer of this embodiment will be described below. Using processing equipment shown in FIG. 2, and in the same manner as in Embodiment 1, a reformed layer 52 reformed to a composition having a ratio of the number of fluorine atoms to the number of carbon atoms, F/C, of 0.85 or more and 1.3 or less is formed on the surface of the nozzle-forming film 51 consisting mainly of polyimide.

A nozzle-forming film 51 having a plurality of nozzle openings 53 formed by laser heating is used as a plastic substrate 1, underneath which is placed an electrode for the substrate 29, and an RF bias voltage is applied to the electrode for the substrate 29. As in Embodiment 1, a highly durable water-repellent and ink-repellent surface with little change in the angle of contact with time can be obtained by applying a negative RF bias voltage in the range between 0

V or more and 40 V or less. However, the RF bias voltage exceeds 40 V is not suitable, because decrease in the angle of contact with time is observed. Therefore, it is critical as in Embodiment 1 that the RF bias voltage is in the range between 0 V and −40 V.

It is preferred from this range of RF bias voltages, and based on relationship between F/C and RF bias voltages on the reformed surface as shown in FIG. 8, that the F/C of the surface composition of the nozzle-forming film 35 is 0.85 or more and 1.30 or less.

Also, from relationship between RF bias voltages and the ratio of the area of $CF_2$ signals to the total area of $C_{1S}$ signals as shown in FIG. 9, it is effective for providing a durable water-repellent surface that the ratio of the area of $CF_2$ signals is in the range between 0.13 or more and 0.20 or less.

Furthermore, from relationship between RF bias voltages and the ratio of the area of $CF_3$ signals to the total area of $C_{1S}$ signals as shown in FIG. 10, it is desirable that the ratio of the area of $CF_2$ signals is in the range between 0.10 or more and 0.17 or less.

High-quality printing could not realized by a head constructed without reforming the nozzle-forming film 51 when the number of shots is 50 million or more, because the degree of wetting by ink increased with increase in the number of printing shots. Whereas, practically demanded 200 million shots of high-quality printing could be achieved by preventing the wetting of the nozzle-forming film 51 for a long period of time, by fabricating a head for an ink jet printer comprising a reformed layer 52 of a component having a ratio of the number of fluorine atoms to the number of carbon atoms, F/C, of 0.85 or more and 1.3 or less formed on the surface of the nozzle-forming film 51 by irradiating fluorine-containing plasma by limiting the range of applying RF bias voltages between 0 and 40 V, and incorporating the head in a printer. Thus, by a head for an ink jet printer according to the present invention, a highly durable ink jet printer having a high-quality printing performance has been able to be provided.

As in the description of Embodiment 1, it is more preferred for the ink-repellency and the durability thereof, that the range of negative RF bias voltages applied on the plastic base material, that is the nozzle-forming film, is further limited to the range between 5 V or more and 30 V or less.

Figure 12:
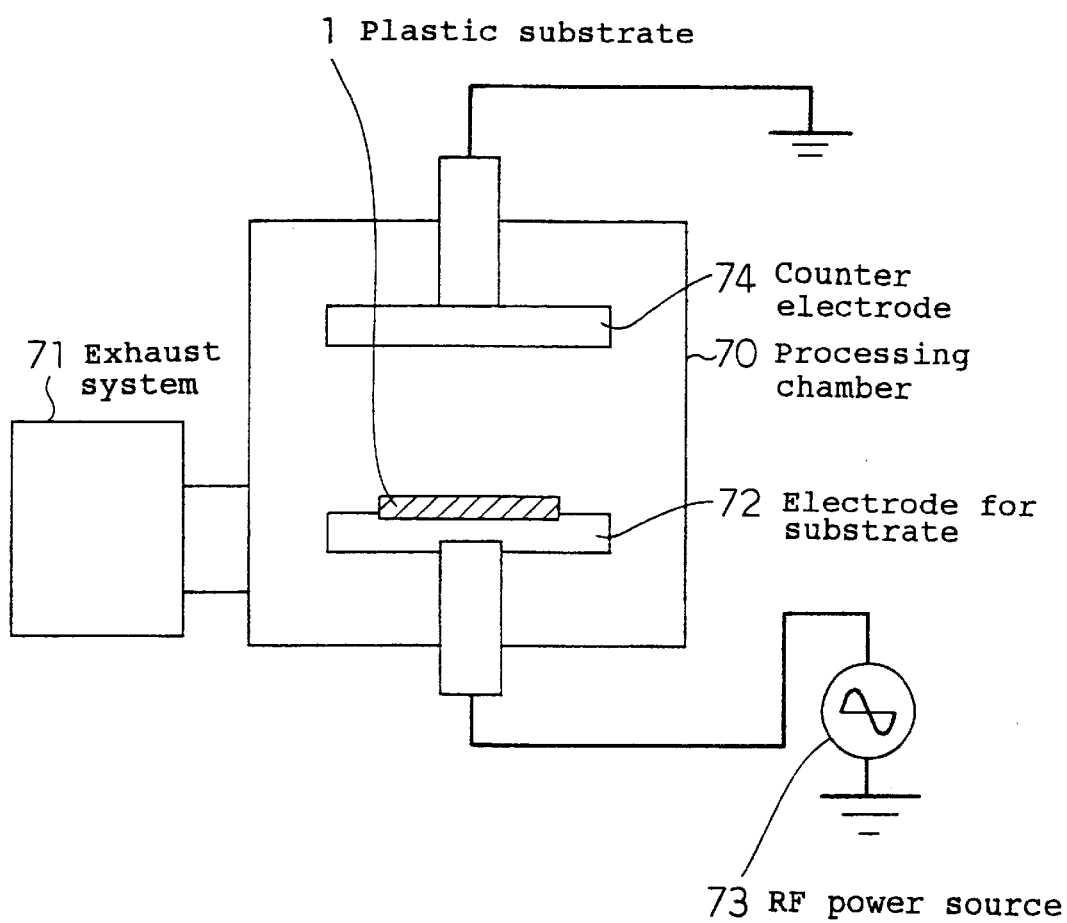
FIG. 12 is a schematic diagram of processing equipment used for the manufacture of a plastic base material according to an embodiment of the present invention.
Figure 13:
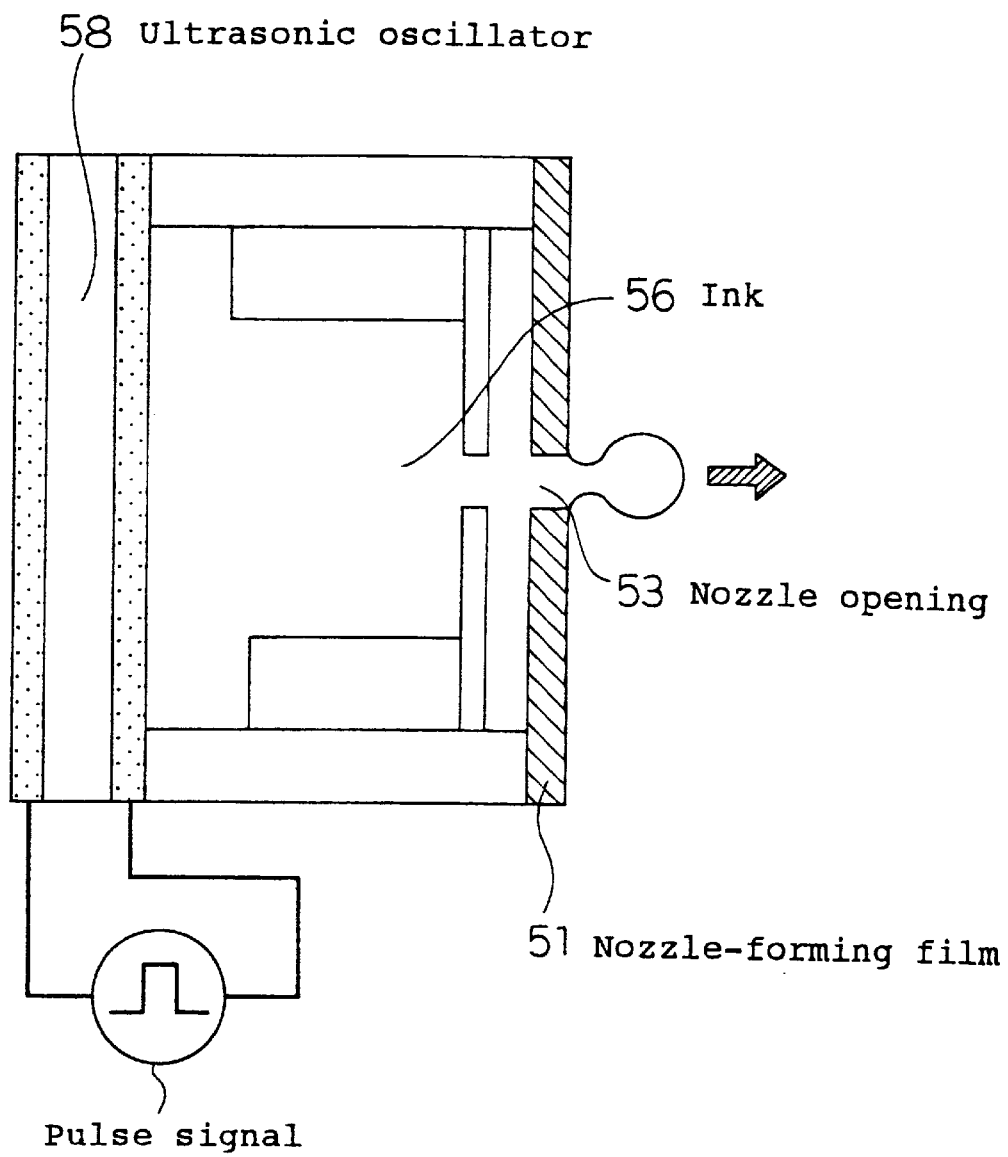
FIG. 13 is a sectional view showing the construction a conventional head for ink-jet printers.
Figure 14:
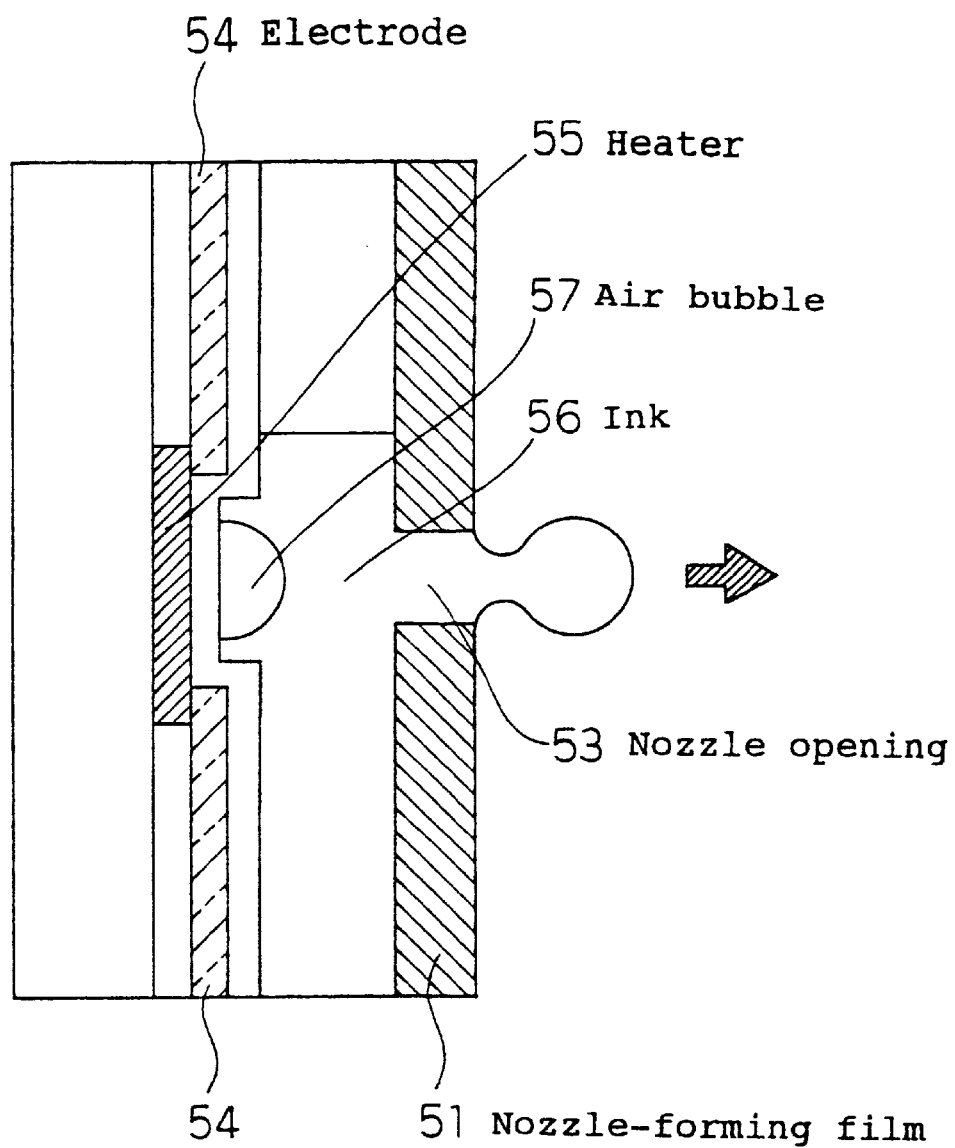
FIG. 14 is a sectional view showing the construction a conventional head for ink-jet printers.
Figure 15A:
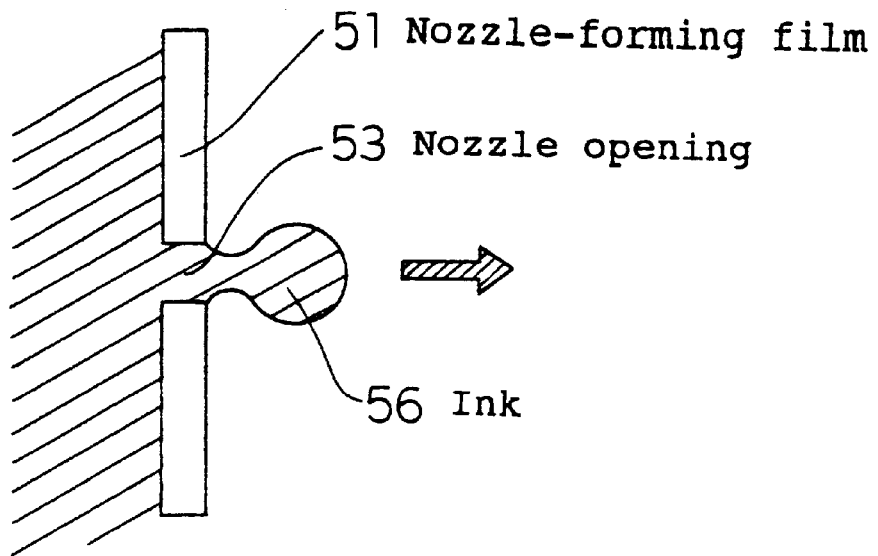
FIGS. 15(a) and 15(b) are sectional views showing ejection in conventional head for ink-jet printers.
Figure 15B:
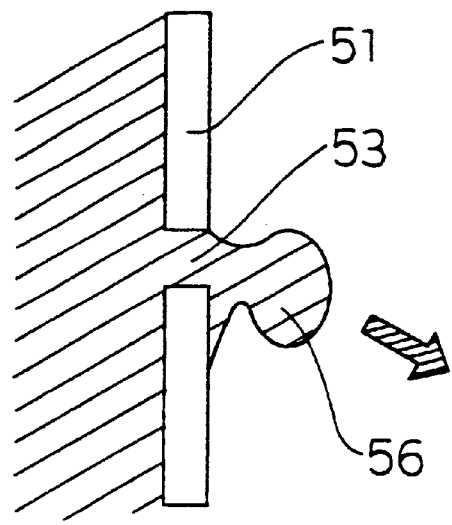

Although the reforming method as shown in FIG. 2 is used in Embodiments 1 and 2, the water-repellency nearly equivalent to the water-repellency obtained by the method described above can be imparted by the plasma reforming method as shown in FIG. 12.

Here, the reforming method will be described below referring to s schematic diagram showing the construction of processing equipment of FIG. 12. In the processing chamber 70 to which an exhaust system 71 is connected is provided an electrode for the substrate 72, on which a plastic substrate 1 is placed. An RF bias voltage is supplied to the electrode for the substrate 72 from an RF power source 73.

After evacuating the processing chamber 70 with the exhaust system 71, $CF_4$ plasma is generated between the electrode for the substrate 72 and the grounded counter electrode 74 by introducing $CF_4$ gas to reduce the pressure in the processing chamber 40 to a vacuum of about 100 mTorr and applying the RF voltage to the electrode for the substrate 72. A negative auto-bias voltage based on the RF voltage is generated on the electrode for the substrate 72, and $CF_4$ plasma is irradiated onto the plastic substrate 1. A highly durable water-repellent surface can also be created by applying such an RF bias voltage.

As described above, the plastic base material of the present invention has a reformed layer on the surface, for example, which contains fluorine, and is reformed to the component having the ratio of the number of fluorine atoms to the number of carbon atoms, F/C, of 0.85 or more and 1.30 or less.

Also, the method of manufacturing the plastic base material comprises the formation of the plastic base material by, for example, irradiating fluorine-containing plasma onto a plastic base material to reform the upper layer of the plastic base material into a fluorine-containing carbon layer, and in particular, the formation of a reformed layer by applying a negative RF bias voltage in the range between 0 V or more and 40 V or less on a plastic base material, and irradiating fluorine-containing plasma onto the plastic base material.

By this, a highly durable water-repellent and ink-repellent surface can be provided.

Next, it is preferred that in the head for an ink jet printer according to the present invention, for example, a fluorine-containing reformed layer is formed on the surface of the nozzle-forming film constituting the head, and in particular, the reformed layer comprises the component having the ratio of the number of fluorine atoms to the number of carbon atoms, F/C, of 0.85 or more and 1.30 or less.

By this, highly durable water-repellency and ink-repellency are imparted on the surface of the nozzle-forming film, the conventional problem, in that the ink ejection track from a nozzle opening becomes unstable due to wetting of the nozzle-forming film by the ink, is solved, and durable high-quality printing can be realized.

Also in the method of manufacturing, since highly durable water-repellency and ink-repellency can be imparted to the surface by applying a negative RF bias voltage in the range between 0 V or more and 40 V or less and irradiating fluorine-containing plasma onto the nozzle-forming film, the industrial value of the method is extremely high.

The present invention exerts the water-repellent effect to any plastic base materials. Many types of plastic base materials containing oxygen as a constituting component exhibit affinity to water and ink when not treated. For such plastic base materials, highly durable water-repellency and ink-repellency can be imparted to the surface more effectively. Therefore, the plastic base material is not limited to polyimide, but the same effect can also be exerted to oxygen-containing plastic materials such as polyethersulfones.

Although the reaction gas for forming the reformed layer 2 is $CF_4$ in the description of Embodiments 1 and 2, the reaction gas is not limited thereto, but the same effect can be obtained when other fluorinated carbon gas, such as $C_2F_6$ is used. Also, the use of a gas containing H in addition to C and F, such as $CHF_3$, is effective, since water-repellency and ink-repellency can be imparted although the effect is a little lower.

Industrial Applicability

According to the present invention, as described above, for example, since a reformed layer containing fluorine and having a component having a ratio of the number of fluorine atoms to the number of carbon atoms, F/C, of 0.85 or more and 1.30 or less is formed on the surface of the plastic base material, a highly durable water-repellent and ink-repellent surface can be provided. Also, according to the present invention, for example, by utilizing the above plastic base material as a nozzle-forming film of a head for an ink jet printer, durable, high-quality printing can be realized.

What is claimed is:

1. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member,
   wherein said nozzle constituting member is a polyimide-based plastic member, and
   wherein the ratio of the area of $CF_2$ signals to the total area of $C_{1S}$ signals of X-ray photoelectron spectrogram on the surface of said reformed layer is in the range between 0.13 or more and 0.20 or less.

2. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member,
   wherein said nozzle constituting member is a polyimide-based plastic member, and
   wherein the ratio of the area of $CF_3$ signals to the total area of $C_{1S}$ signals of X-ray photoelectron spectrogram on the surface of said reformed layer is in the range between 0.10 or more and 0.17 or less.

3. A method of manufacturing a head for an ink-jet printer comprising a nozzle constituting member having a plurality of nozzle openings formed thereon, for ejecting ink from said nozzle openings,
   wherein an upper layer of said nozzle constituting member is reformed into a layer containing fluorine and carbon forming C—F bonds by irradiating fluorine-containing plasma onto said nozzle constituting member while applying a negative RF bias voltage in the range between 0 V or more and 40 V or less to said nozzle constituting member.

4. A method of manufacturing a head for an ink-jet printer comprising a nozzle constituting member having a plurality of nozzle openings formed thereon, for ejecting ink from said nozzle openings,
   wherein an upper layer of said nozzle constituting member is reformed into a layer containing fluorine and carbon forming C—F bonds by irradiating fluorine-containing plasma onto said nozzle constituting member while applying a negative RF bias voltage in the range between 5 V or more and 30 V or less to said nozzle constituting member.

5. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member,
   wherein the ratio of the number of fluorine atoms to the number of carbon atoms of said reformed layer, F/C, is 0.85 or more and 1.30 or less, and
   wherein the ratio of the area of $CF_2$ signals to the total area of $C_{1S}$ signals of X-ray photoelectron spectrogram on the surface of said reformed layer is in the range between 0.13 or more and 0.20 or less.

6. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member,
   wherein the ratio of the number of fluorine atoms to the number of carbon atoms of said reformed layer, F/C, is 0.85 or more and 1.30 or less, and
   wherein the ratio of the area of $CF_3$ signals to the total area of $C_{1S}$ signals of X-ray photoelectron spectrogram on the surface of said reformed layer is in the range between 0.10 or more an 0.17 or less.

7. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member, and
   wherein the ratio of the area of $CF_2$ signals to the total area of $C_{1S}$ signals of X-ray photoelectron spectrogram on the surface of said reformed layer is in the range between 0.13 or more and 0.20 or less.

8. A head for an ink-jet printer comprising a nozzle constituting member having a plurality of nozzle openings formed thereon for ejecting ink from said nozzle openings,
   wherein a fluorine-containing reformed layer is formed on the surface of said nozzle constituting member, and
   wherein the ratio of the area of $CF_3$ signals to the total area of $C_{1S}$ signals of X-ray photoelectron spectrogram on the surface of said reformed layer is in the range between 0.10 or more and 0.17 or less.

* * * * *